UNITED STATES PATENT OFFICE.

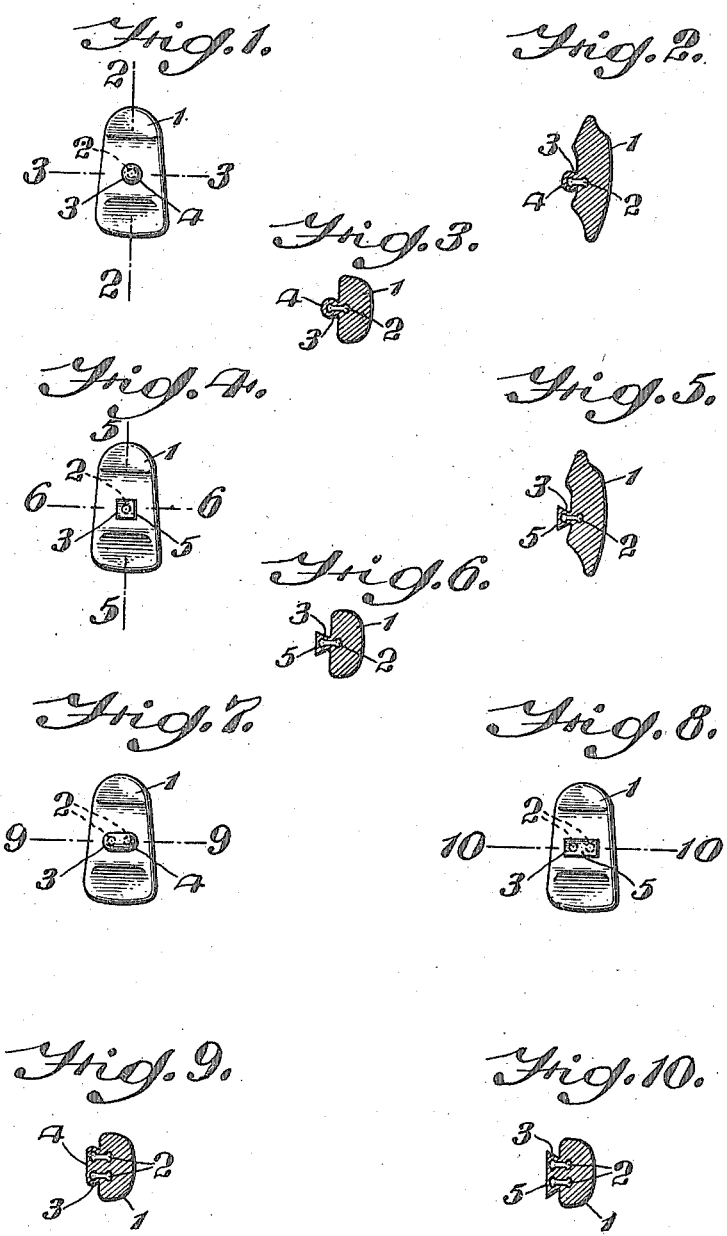

HIRAM O. COWDRICK, OF PHILADELPHIA, PENNSYLVANIA.

ARTIFICIAL TOOTH.

1,264,615.  Specification of Letters Patent.  Patented Apr. 30, 1918.

Application filed August 27, 1917. Serial No. 188,339.

*To all whom it may concern:*

Be it known that I, HIRAM O. COWDRICK, a citizen of the United States, residing in the city and county of Philadelphia, State of Pennsylvania, have invented a new and useful Artificial Tooth, of which the following is a specification.

My invention consists of an artificial tooth provided with an outwardly-extending tongue composed of the material of the tooth, and an attaching pin having heads on opposite ends of the shank thereof, one of the heads being embedded in the body of the tooth, and the other head thereof being embedded in said tongue, whereby said shank and its heads are completely removed from contact with the material of the mouth plate and vice versa, thus providing a firm connection for the tooth with the mouth plate and vice versa. It consists also in forming the exterior of said tongue comparatively of dovetailed form whereby the tongue will be interlocked in a firm manner with the mouth piece and vice versa.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1, represents a rear view of an artificial tooth embodying my invention.

Fig. 2 represents a longitudinal section thereof on line 2—2, Fig. 1.

Fig. 3 is a horizontal section on line 3—3, Fig. 1.

Figs. 4, 7 and 8 are rear views of teeth with other embodiments of my invention thereon.

Fig. 5 represents a longitudinal section on line 5—5, Fig. 4.

Fig. 6 represents a horizontal section on line 6—6, Fig. 5.

Fig. 9 represents a horizontal section, on line 8—8, Fig. 7.

Fig. 10 represents a horizontal section on line 10—10, Fig. 8.

Similar numerals of reference indicate corresponding parts in the figures.

Referring to the drawings:—

1 designates an artificial tooth and 2 designates a headed pin on the lingual side of the tooth, said pin having a head on each end of its shank, the same having one end portion of said shank with a head thereon embedded in the body of said tooth and another end portion with its head thereon projecting outside of said body on said side.

The tooth is formed of porcelain, and the pin with its heads is formed of metal of a nature as will be hereinafter stated.

3 designates a tongue comprising a cover or sheath for the outwardly projecting end portion of the shank of the pin with the head thereon, the same in the present case being homogeneous with the material of the body of the tooth and extending from the rear of the body of the tooth and primarily worked around said projecting end portion so as to envelop and cover the same, and being integral with said body, is jointless therewith so that when the tooth is baked or biscuited the tongue 3 is baked or biscuited with the tooth and so remains firmly connected with the body of the tooth with the outwardly projecting end portion of the pin with the head thereon embedded in said tongue, while the opposite or inner end portion of the pin with the head thereon is embedded in the body of the tooth as has been stated, the pin thus providing the means for connection of the tooth with the mouth plate or vice versa with the advantage that the portion of the pin outside of the tooth and its head has the tongue 3 thereover, hence the material of the mouth plate that would close ordinarily around the projecting portion of the pin closes around said tongue and so is removed from direct contact with said portion of the pin, hence said material engages directly with said tongue and takes firm hold thereof without liability to become loose thereon, due to the shrinkage of the pin, avoiding also any chemical action between the pin and mouth plate both after the vulcanization of the mouth plate in its attachment to the tooth. The heads of the pin being enlargements of the shank on the ends thereof adapt the material of the body of the tooth and of the tongue in which the heads are respectively embedded to interlock with said heads by substantial dovetailed-locking effects.

Furthermore, owing to the cover or sheath I am enabled to employ a pin of some inferior metal and so effect a saving in expense over a pin made of superior metal, such as platina, etc., as heretofore used.

The exterior of the sheath may be bulbous or rounded as at 4, Figs. 1, 2, and 3, or angular as at 5, Figs. 4, 5, and 6, forming in a measure in either case a dovetail effect.

While I have shown in Figs. 1 to 6 inclusive, a single pin, and consequently a single tongue, I may employ two pins on a tooth as in Figs. 7 to 10 inclusive, and a tongue may envelop the outwardly projecting portion of both pins each with their heads on opposite ends thereof on a tooth, in which case the exterior of the tongue may be rounded or bulbous as shown in Figs. 7 and 9, or it may be angular and so dovetailed as in Figs. 8 and 10, producing in either case a dovetailed effect, it being seen that the material of the mouth plate dovetails with the exterior of said tongue, and the interior of the tongue or tongues dovetails with the head or heads of the pin or pins within the tongues, thus providing a strong connection for the tongue with the body of the tooth, and consequently of the mouth plate with the exterior of the tongue or vice versa.

Having thus described my invention, what I claim as new and desire to secure by Letters Patent, is:—

1. An artificial tooth having a tongue integral with the body thereof, and a pin partly embedded in said body, and partly embedded in said tongue, the part within said tongue being completely enveloped by the latter.

2. In an artificial tooth, a double headed pin, and a tongue integral with the body of the tooth and projecting therefrom on the lingual side thereof, a head on the shank of the pin being in said tongue and completely enveloped by the latter.

3. An artificial tooth having on the lingual side of its body a tongue which projects therefrom and is integral therewith, and a pin having on each end of its shank a head, one of the heads with the adjacent portion of the shank of the pin being embedded in said body and the other head with the adjacent portion of the pin being embedded in said tongue and completely covered by the latter, the head within said tongue being engaged by the material of the tongue by a substantial dovetailed locking effect.

4. An artificial tooth having on the lingual side of its body a tongue which projects therefrom and is integral therewith, and a pin having on each end of its shank a head, one of the heads with the adjacent portion of the shank of the pin being embedded in said body, and the other head with the adjacent portion of the pin being embedded in said tongue and completely covered by the latter, the exterior of said tongue being substantially of dovetailed form.

HIRAM O. COWDRICK.

Witnesses:
JOHN A. WIEDERSHEIM,
ANNA V. BYRNE.

Copies of this patent may be obtained for five cents each, by addressing the "Commissioner of Patents, Washington, D. C."